United States Patent
McCarthy et al.

(10) Patent No.: US 7,848,977 B2
(45) Date of Patent: Dec. 7, 2010

(54) PRIVATE LABEL PURCHASE CARD ACCEPTANCE SYSTEMS AND METHODS

(75) Inventors: James Alan McCarthy, Omaha, NE (US); Paul Matthew Fortney, Omaha, NE (US); Curtis Gregory Winchester, Omaha, NE (US); Brian Lee Teller, Omaha, NE (US); Douglas James Byerley, Overland Park, KS (US); Arthur Silvio Velez, Bel Air, MD (US); Joni Wren Wheeler, Omaha, NE (US); Stephen Jay Hug, Omaha, NE (US)

(73) Assignee: First Data Corporation, Englewood, CO (US)

( * ) Notice: Subject to any disclaimer, the term of this patent is extended or adjusted under 35 U.S.C. 154(b) by 1350 days.

(21) Appl. No.: 11/125,822

(22) Filed: May 9, 2005

(65) Prior Publication Data

US 2006/0253390 A1    Nov. 9, 2006

(51) Int. Cl.
  *G06Q 40/00*    (2006.01)
(52) U.S. Cl. ........................................... 705/35
(58) Field of Classification Search ............... None
  See application file for complete search history.

(56) References Cited

U.S. PATENT DOCUMENTS

| | | | | |
|---|---|---|---|---|
| 4,941,090 | A * | 7/1990 | McCarthy | 705/14 |
| 5,748,908 | A * | 5/1998 | Yu | |
| 6,324,525 | B1 * | 11/2001 | Kramer et al. | 705/40 |
| 6,549,912 | B1 * | 4/2003 | Chen | 1/1 |
| 6,601,037 | B1 * | 7/2003 | Kolls | 705/14 |
| 6,607,136 | B1 * | 8/2003 | Atsmon et al. | 235/492 |
| 6,615,190 | B1 * | 9/2003 | Slater | |
| 6,805,289 | B2 * | 10/2004 | Noriega et al. | 235/380 |
| 6,915,277 | B1 * | 7/2005 | Manchester et al. | |
| 6,980,970 | B2 * | 12/2005 | Krueger et al. | |
| 7,006,993 | B1 * | 2/2006 | Cheong et al. | 705/38 |
| 7,050,996 | B1 * | 5/2006 | Blagg et al. | 705/30 |
| 7,069,244 | B2 * | 6/2006 | Strayer et al. | 705/39 |
| 7,076,465 | B1 * | 7/2006 | Blagg et al. | 705/40 |

(Continued)

OTHER PUBLICATIONS

The Stores They are a Changin—The Washington Shopping Plate, cited for a portion which attests to the existence of said card dating to the 1950's. and 1960's.*

(Continued)

*Primary Examiner*—Alexander Kalinowski
*Assistant Examiner*—Bruce I Ebersman
(74) *Attorney, Agent, or Firm*—Townsend and Townsend and Crew LLP

(57) ABSTRACT

A method of processing a purchase card transaction includes receiving a transaction request at a host computer system from a point-of-sale device of a first merchant. The transaction request comprises transaction details relating to a purchase from the first merchant using a private label purchase card relating to a second merchant and an issuer. The first merchant and the second merchant are different merchants. The transaction details comprise at least an identifier relating to the first merchant, an amount, and an account identifier relating to the private label purchase card. The method further includes evaluating at least a portion of the account identifier, recognizing that the account identifier relates to the issuer, routing at least a portion of the transaction request to the issuer, and facilitating a payment from the issuer to the first merchant.

18 Claims, 2 Drawing Sheets

U.S. PATENT DOCUMENTS

| | | | |
|---|---|---|---|
| 7,082,533 B2 * | 7/2006 | Wheeler et al. | 713/155 |
| 7,249,092 B2 * | 7/2007 | Dunn et al. | 705/38 |
| 7,263,507 B1 * | 8/2007 | Brake, Jr. et al. | |
| 7,318,048 B1 * | 1/2008 | King | 705/39 |
| 7,363,265 B2 * | 4/2008 | Horgan | 705/35 |
| 7,406,442 B1 * | 7/2008 | Kottmeier et al. | 705/35 |
| 7,409,369 B1 * | 8/2008 | Homuth et al. | 705/39 |
| 2002/0138428 A1 * | 9/2002 | Spear | |
| 2002/0156723 A1 * | 10/2002 | Lilly et al. | 705/38 |
| 2003/0061157 A1 * | 3/2003 | Hirka et al. | 705/39 |
| 2003/0144935 A1 * | 7/2003 | Sobek | |
| 2003/0212620 A1 * | 11/2003 | Blagg | 705/35 |
| 2003/0229584 A1 * | 12/2003 | Brown | 705/39 |
| 2004/0039693 A1 | 2/2004 | Nauman et al. | |
| 2004/0054622 A1 | 3/2004 | Strayer et al. | |
| 2004/0117300 A1 * | 6/2004 | Jones et al. | |
| 2004/0236682 A1 | 11/2004 | Strayer et al. | |
| 2004/0249749 A1 | 12/2004 | Strayer et al. | |
| 2006/0020542 A1 * | 1/2006 | Litle et al. | 705/40 |
| 2006/0036538 A1 * | 2/2006 | Griffis et al. | 705/39 |
| 2006/0175394 A1 * | 8/2006 | Caven et al. | |
| 2006/0253390 A1 * | 11/2006 | McCarthy et al. | |
| 2008/0021826 A1 * | 1/2008 | Brake, Jr. et al. | |

OTHER PUBLICATIONS

TRF to Launch Umbrella Customer Credit Card Retail Week, Aug. 6, 1993, p. 3.*

It's Pin Debit, Man, Jeffry Green, Cards and Payments, Dec. 2005, 2 pages.*

* cited by examiner

PRIVATE LABEL PURCHASE CARD ACCEPTANCE SYSTEMS AND METHODS

CROSS-REFERENCES TO RELATED APPLICATIONS

This application is related to co-pending, commonly-assigned U.S. patent application Ser. No. 10/245,784, entitled "METHOD AND SYSTEM FOR MERCHANT PROCESSING OF PURCHASE CARD TRANSACTIONS WITH EXPANDED CARD TYPE ACCEPTANCE," filed on Sep. 17, 2002, by Strayer, et al. and to co-pending, commonly-assigned U.S. patent application Ser. No. 10/460,741, entitled "VALUE PROCESSING NETWORK AND METHODS," filed on Jun. 11, 2003, by Nauman, et al. the entirety of each of which are herein incorporated by reference for all purposes.

BACKGROUND OF THE INVENTION

Embodiments of the present invention relate generally to purchase card transaction processing. More specifically, embodiments of the present invention relate to systems and methods for processing private label purchase card transactions for purchases at merchants other than the issuing merchant.

Purchasing of goods and services using a purchase card (e.g., credit card or debit card) for payment has become commonplace. Card issuers, such as banks, retailers, or other financial service providers, provide cardholders with purchase card accounts. The card issuer agrees to transfer funds to various merchants—either directly or via an intermediary—in payment for goods and services received by the cardholder, and the cardholder agrees either to repay the card issuer or to have funds deducted from the cardholder's deposit account. The cardholder receives a presentation instrument, which is typically a rectangular piece of plastic bearing a card number and other identifying information. To purchase goods or services, the cardholder either presents the presentation instrument or provides the card number to a merchant. The merchant accepts the presentation instrument and delivers the goods or services to the customer, generating a transaction record (ticket) in paper or electronic form. In order for the merchant to be paid and the cardholder to be billed, the merchant typically submits the ticket to an acquiring bank for processing.

Acquirer processing (also called merchant processing) of purchase card transactions is complicated by a number of factors. For instance, how a purchase card transaction is processed depends on the particular card product used. For example, some card products (e.g., VISA and MASTERCARD products) are "interchange" cards, which are issued by various banks or other institutions under the authority of a card association that establishes rules regarding the use and acceptance of the card products. Each card association typically provides an interchange service for routing transactions between an acquiring bank and a card issuing bank. An interchange card generally may be accepted by any merchant, as long as the merchant maintains an account with an acquiring bank (or other institution) that participates in the card association. Authorization and settlement requests for interchange cards are generally processed by routing the requests from the acquiring bank to the card association, which then routes the requests to the card issuing bank. Other card products may be "private label" products, for which routing of requests between banks is not supported. For such cards, it is generally necessary the acquiring bank also be the card issuing bank, making the acceptance of such cards limited. Examples include credit cards issued by retailers, which are usually accepted only at the retailer's own outlets.

Transaction processing is further complicated by the variety of card products that a single card association or issuer may offer. For instance, a large card association (e.g., the VISA or MASTERCARD association) typically offers a range of card products such as credit cards (where the cardholder is billed for purchases), check cards (where purchase amounts are deducted directly from the cardholder's checking account), corporate cards (where an employer of the cardholder receives the bill), and so on. Each card product may be subject to different rules and regulations regarding the use, acceptance, and processing of the card product.

Still more complexity arises due to card issuers' participation in electronic debit networks such as the NYCE or PLUS networks. These debit networks typically do not issue card products themselves. Instead, they agree with various banks to provide network services for routing debit card transactions from an acquiring bank to a card issuing bank. An issuing bank may participate in multiple electronic debit networks; cards issued by the bank generally bear a badge for each debit network in which the bank participates. Thus, depending on where and how it is presented, the same plastic could be used, e.g., for a credit card transaction to be routed through the VISA interchange or a debit card transaction to be routed through the NYCE network or the PLUS network. An acquiring bank must be able to distinguish these uses and properly route each transaction.

Yet another layer of complexity is added by the possibility that the cardholder may present the same card to a merchant for different types of transactions. For instance, in addition to sales transactions, the cardholder may desire to return goods previously purchased using the card, obtain a cash advance using the card, or make a payment on the outstanding balance of the card account. Each card association or issuer has rules related to whether a merchant may accept a particular card product for each type of transaction. For instance, a retail outlet may be authorized to accept an interchange card for sales but not for cash advances; the same retail outlet may be authorized to accept both sales and cash transactions using a debit network.

To accommodate customer preferences, many merchants desire to offer a variety of options to their customers, including the ability to use a number of different card products from different issuers, associations, and networks, as well as the ability to perform different types of transactions for a particular card product. At the same time, merchants also desire to control expenses associated with accepting different card products, for instance, by not having to maintain accounts with a number of different acquiring banks. Thus, in order to provide effective card processing services to a merchant, an acquiring bank must be prepared to process a variety of card products and transaction types, routing each transaction to the correct destination, deducting appropriate fees, and keeping accurate records of activity.

To assist acquiring banks, third-party merchant services providers offer transaction processing services to a number of such banks. In addition to managing the processing and recording of card transactions, such a third-party provider must also manage information regarding which card products and transaction types a particular one of its acquiring bank clients is allowed to accept, in addition to information about each merchant.

An acquiring bank or a third-party service provider generally operates one or more platforms for processing purchase card transactions. Each platform includes various data stores, such as merchant records that provide information about each merchant account; the record for a particular merchant may be identified by a unique merchant identification number. The platform receives a batch of transaction tickets from the merchant, transfers corresponding funds to the merchant's account, routes tickets to the appropriate entities for settlement, and keeps records of the merchant's activity for accounting and reporting purposes.

Existing systems are limited in their ability to process a merchant's transactions involving a variety of card products and transaction types. For example, in some existing systems, a private label card is implemented using a processing platform that has both the cardholder account records and the merchant account records, thereby eliminating the need to route the transactions to another system for settlement. However, such platforms may be unable to handle processing of interchange card transactions, for which different formatting and routing procedures are required. Thus, a separate platform is usually provided for interchange cards. Consequently, a merchant who accepts both a private label card and an interchange card must have a record on two different platforms, generally with a different identification number on each platform. Either the merchant must submit transactions separately (i.e., in separate batches) for the two card products or the transactions must be rebatched prior to processing. In either case, there is generally no link between the merchant records on the two processing platforms: the merchant receives reports separately for each card, and any changes to the merchant data (e.g., the merchant's address) must be made separately on each system. Similar problems may arise in regard to other combinations of card products having conflicting processing rules. In some instances, the overhead associated with handling additional card products causes acquiring banks or third-party providers to limit the merchant's options for accepting various cards.

Existing systems also limit the ability of a merchant to accept different transaction types. For instance, many existing systems limit a merchant record to one or two transaction types per card product (e.g., sales and returns only, or cash advances and payments only). Thus, if a merchant desires to accept both sales and cash advance transactions for a particular card product, two records would have to be maintained for the merchant. Either the merchant is required to submit separate batches for each transaction type or the transactions are rebatched prior to processing. Again, this leads to inefficiency and overhead that may cause acquiring banks or third party providers to limit the merchant's options for allowing customers to perform different transactions.

Among other things, it is desirable to provide issuers more flexibility with respect to acceptance of their private label cards.

BRIEF SUMMARY OF THE INVENTION

Embodiments of the invention thus provide a method of processing a purchase card transaction. The method includes receiving a transaction request at a host computer system from a point-of-sale device of a first merchant. The transaction request comprises transaction details relating to a purchase from the first merchant using a private label purchase card relating to a second merchant and an issuer. The first merchant and the second merchant are different merchants. The transaction details comprise at least an identifier relating to the first merchant, an amount, and an account identifier relating to the private label purchase card. The method further includes evaluating at least a portion of the account identifier, recognizing that the account identifier relates to the issuer, routing at least a portion of the transaction request to the issuer, and facilitating a payment from the issuer to the first merchant.

In some embodiments, routing at least a portion of the transaction request to the issuer includes standardizing a format of the transaction request and sending the transaction request to a processing platform of the issuer, thereby avoiding an interchange network. Facilitating a payment from the issuer to the first merchant may include facilitating an electronic payment via an electronic payment processing network. The electronic payment processing network may include the Automated Clearing House Network. The payment may be less than the amount. Evaluating the at least a portion of the account number may include determining whether a prefix of the account number falls within a range of cross-shopping account number prefixes. Routing at least a portion of the transaction request to the issuer may include routing the transaction request to a cross-shopping platform, using at least a portion of the transaction request to identify rules relating to the first merchant and the issuer, and processing the transaction request according to the rules. Receiving a transaction request at a host computer system may include receiving the transaction request at a routing switch in which case the method may include, prior to the transaction, receiving a request from the issuer to enroll the first merchant as a cross-shopping merchant, and configuring the switch to recognize a transaction request involving the first merchant and the issuer as a cross-shopping transaction and to process the transaction accordingly. Configuring the switch to recognize a transaction request involving the first merchant and the issuer as a cross-shopping transaction and to process the transaction accordingly may include populating a data storage arrangement with one or more account number prefixes relating to private label purchase cards issued by the issuer, which, by virtue of an agreement between the issuer and the first merchant, the first merchant can accept for transactions.

In still other embodiments, the method may include classifying the transaction request as a cross-shopping transaction, maintaining a record of both cross-shopping transactions and non-cross-shopping transactions with respect to two different account limits, a cross-shopping account limit and a non-cross-shopping account limit, and, for a subsequent cross-shopping transaction, rejecting the transaction request as being over the cross-shopping account limit. The cross-shopping account limit may be less than the non-cross-shopping account limit.

Other embodiments provide a system for processing cross-shopping purchase card transactions. A cross-shopping purchase card transaction is a transaction in which a merchant accepts a private label purchase card of a different merchant. The system includes a storage arrangement configured to store settlement rules for processing cross-shopping transactions between specific issuers and accepting merchants. An accepting merchant is a merchant who accepts a private label purchase card of another merchant. The system also includes a cross-shopping transaction platform that is programmed to process cross-shopping transactions according to the settlement rules. The system also includes a switch configured to direct incoming cross-shopping transactions to the cross-shopping transaction platform and means for facilitating a payment from an issuer to an accepting merchant while bypassing an interchange network.

In some embodiments, the means for facilitating a payment from an issuer to an accepting merchant while bypassing an interchange network includes means for facilitating an electronic payment via the Automated Clearing House network. The settlement rules include rules that define a cross-shopping account limit that establishes a maximum account balance for cross-shopping transactions. The maximum account balance for cross-shopping transactions may be less than a maximum account balance for all purchases. The settlement rules may include rules that establish a discount for the payment from the issuer to the accepting merchant for cross-shopping transactions.

In still other embodiments, a cross-shopping purchase card processing platform includes means for receiving a transaction request formatted as a cross-shopping transaction in which an accepting merchant accepts a private label purchase card of a different merchant. The platform also includes means for embodying an agreement between the accepting merchant and an issuer of the private label card, means for processing the transaction request according to the agreement, and means for facilitating a payment from the issuer to the accepting merchant while bypassing an interchange network.

In some embodiments of the cross-shopping purchase card processing platform, the means for facilitating a payment from the issuer to the accepting merchant while bypassing an interchange network includes means for facilitating an electronic payment via the Automated Clearing House network. The means for processing the transaction request according to the agreement may include means for determining a discount for the payment from the issuer to the accepting merchant for cross-shopping transactions. The means for processing the transaction request according to the agreement may include means for rejecting transactions that place an account balance for cross-shopping transactions above a threshold account balance for cross-shopping transactions.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Embodiments of the invention provide improved systems and methods for processing purchase card transactions. "Purchase card," as used herein, will be understood to refer to any of a variety of presentation instruments, including credit cards, debit cards, stored value cards, and the like, whether embodied as a traditional embossed plastic card or other suitable device. One type of purchase care is a "private label purchase card." As is known, merchants, either on their own or with the assistance of an issuer (e.g., a bank), issue private label purchase cards. Such cards typically carry the brand of the merchant and are accepted for purchase transactions by the merchant but are not accepted by other merchants. According to embodiments of the invention, however, merchants may accept private label purchase cards issued by other merchants. The issuer of the private label purchase card agrees to reimburse the accepting merchant (i.e., the merchant that accepts the private label card of another merchant) for purchases made by customers using the card, typically at a discount of the transaction amount.

Figure 1:
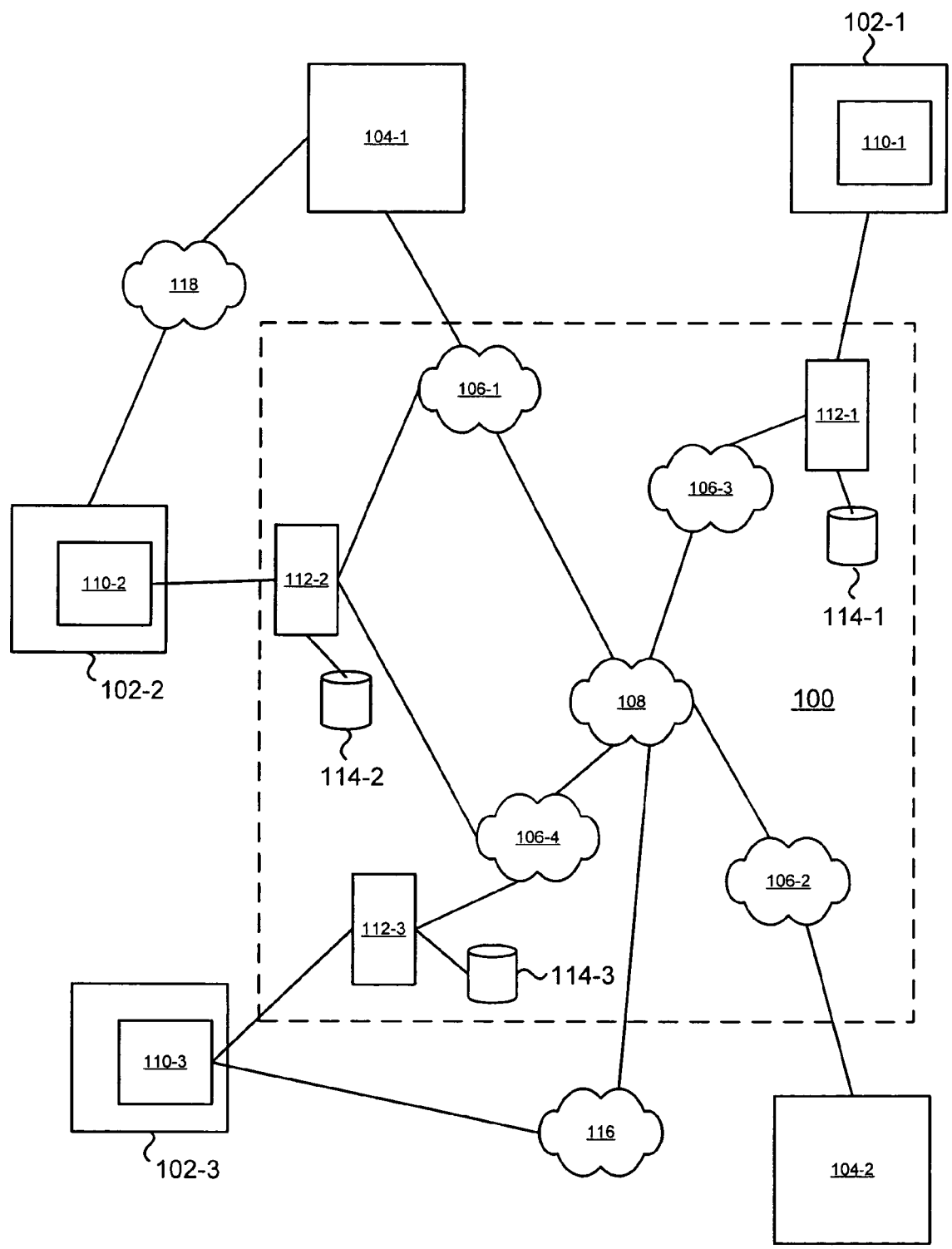
FIG. 1 illustrates an exemplary system according to embodiments of the invention.

FIG. 1 illustrates an exemplary processing system 100 according to embodiments of the invention, through which any of a variety of transactions using purchase cards may be settled. Via the system 100, merchants 102 are able to settle purchase card transactions with purchase card issuers 104. In this exemplary embodiment, the system 100 includes a number of processing platforms 106 each configured to process particular transactions. For example, platforms such as platforms 106-1 and 106-2 may be specifically configured to process transactions for specific issuers 104-1, 104-2, respectively. Other platforms, such as the platform 106-3, may be specifically configured to process transactions for merchants, such as the merchant 102-1, located in a specific geographic region. Still other platforms, such as the platform 106-4, may be specifically configured to process, at least in part, "cross-shopping" transactions. Many other possibilities exist.

"Cross-shopping," as used herein, will be understood to refer to a merchant accepting a private label card of another merchant. The practice is enabled, generally, by the issuer of the private label card and the merchant, hereinafter referred to as an "accepting merchant," agreeing to terms upon which the accepting merchant may accept the private label card that is not its own.

Each platform 106 may include computing devices, network components, storage systems, and the like that allow the platforms to process transactions. Platforms 106 may be centrally located within a single facility or the various components of a platform may be distributed geographically and interconnected via wired and/or wireless connections.

The platforms 106 may be configured for communication directly with one another or may be interconnected via a network 108 as shown. The network may include intelligent processing systems, wired and wireless connections, storage arrangements, and/or the like. An exemplary network is described more fully in previously-incorporated U.S. patent application Ser. No. 10/460,741.

The merchants 102 may be internal merchants, such as the merchants 102-1, 102-2 (i.e., merchants who routinely process purchase card transactions via the system 100) or external merchants 102-3 (i.e., merchants who routinely process purchase card transactions via other systems).

As is known, merchants 102 typically have point-of-sale (POS) devices 110 through which transaction information is transmitted to the system 100. POS devices typically are configured to communicate with a switch 112 within the processing system 100. Switches 112 are configured to receive transaction information from the POS devices 110 and route the transaction information to an appropriate platform 106. Switches 112 may have associated storage systems 114 for maintaining data used to determine where transaction requests should be routed.

The system 100 may be configured to communicate with one or more external processing networks, such as the network 116. In some embodiments, the network 116 is an interchange network, that may be a branded network (e.g., the VISA® network or the MASTERCARD® network). Also, as will be described in more detail hereinafter, an issuer, such as the issuer 104-1, may settle a transaction with an accepting merchant, such as the merchant 102-2, by sending a payment through a money transfer network 118, which may be, for example, the Automated Clearing House (ACH) network.

According to embodiments of the invention, an issuer 104-1 issues private label cards for a merchant 102-1. The merchant 102-1 may have a number of outlets, although only one is shown here. The POS devices located at the merchant's outlets may send transactions to any specific processing platform, not merely the platform 106-1 at which the issuer's transactions are processed. The issuer 104-1 and one or more merchants 102-2, 102-3 agree to terms under which the merchants 102-2, 102-3 may accept the private label card of the merchant 102-1. The switches 112-2 and 112-3 are programmed to direct transaction requests in which the private label card is used to the cross-shopping platform 106-4. In the case of internal merchants, such as the internal merchant 102-2, this involves, for example, storing a range of account number prefixes (commonly referred to as a BIN, ISO, or prefix) at the storage arrangements 114-2, 114-3 of the switches 112-2, 112-3. For external merchants, such as the merchant 102-3, this involves the additional step of programming the POS device 110-3 of the external merchant 102-3 to recognize a purchase card as a private label card of another merchant. Otherwise, the POS 110-3 would route the transaction information to the network 116, through which the external merchant 102-3 typically processes transactions.

When a switch 112 receives a cross-shopping transaction request, the switch routes the transaction to the cross-shopping platform 106-4. Because different platforms 106 process transaction requests using different formats, the cross-shopping platform 106-4 standardizes the format of the transaction request. It also identifies the issuer of the private label card used in the transaction, in this case the issuer 104-1, and routes the transaction request to the platform that process the issuer's transactions, in this case, the platform 106-1.

The platform 106-1 posts the transaction to the account of the customer to whom the card was issued and facilitates payment from the issuer 104-1 to the merchant that accepted the card for a transaction, in this case the merchant 102-2. In some cases, this includes facilitating a funds transfer through the network 118. The issuer 104-1 may withhold a portion of the transaction amount as a fee. The amount withheld may be a fixed amount or a percentage of the transaction amount and typically is based on an agreement between the merchant 102-2 and the issuer 104-1.

Figure 2:
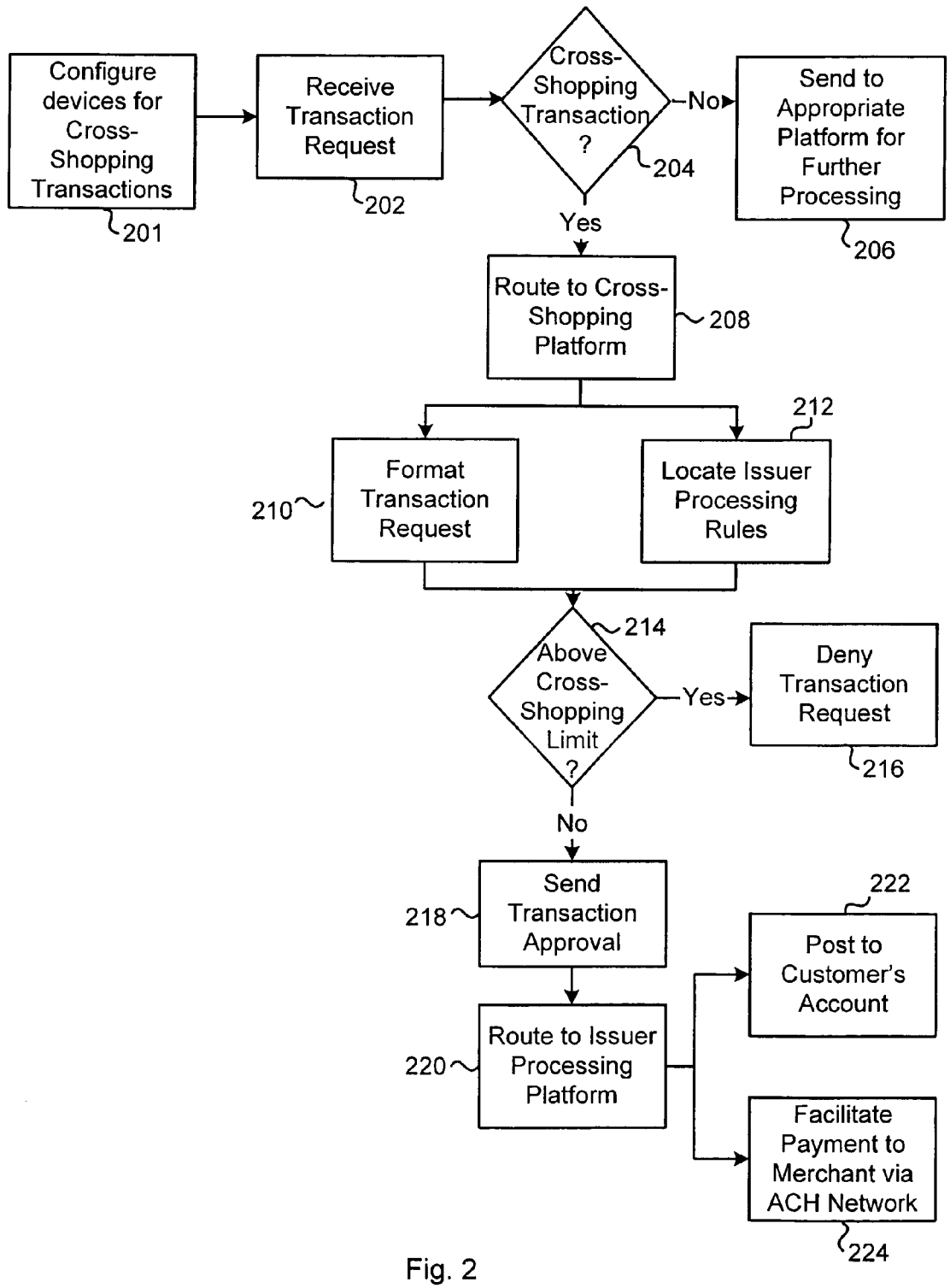
FIG. 2 illustrates an exemplary method according to embodiments of the invention, which method may be implemented in the system of FIG. 1.

Having described a system according to embodiments of the invention, attention is directed to FIG. 2, which illustrates an exemplary cross-shopping method 200 according to embodiments of the invention. The method may be implemented in the system of FIG. 1, or other appropriate system. It is to be understood that other exemplary methods according to other embodiments may have more, fewer, or different steps than those illustrated and described here. Further, method steps in some embodiments are traversed in orders different than those illustrated and described here. Those skilled in the art will appreciate a variety of embodiments in light of this description.

The method 200 begins at block 201 at which various system components are configured for cross-shopping transactions. This may involve any of a number of system configurations and may be triggered by an agreement between a specific accepting merchant and a specific issuer. For example, a particular issuer may desire to allow cross-shopping transactions with some merchants and not others. Further, different agreements between accepting merchants and issuers may involve different processing rules, such as the fee the issuer may withhold from a transaction amount. In some cases, the fee is a fixed amount, while in others the fee is a fixed percentage. Many possibilities exist. Hence, some agreements require modifications at the acquiring merchant's POS, some require modifications as the switch to which the acquiring merchant directs transaction requests, and still other agreements result in modifications to rules databases at the processing platform of the issuer.

If an acquiring merchant does not routinely direct transaction requests to the processing system of the issuer of the private label card the acquiring merchant would like to accept, then a modification to the POS of the merchant may be necessary. This situation is depicted as the merchant 102-3 of FIG. 1. The merchant 102-3 typically sends transaction requests to the external processing system 116. For the merchant 102-3 to accept the private label card issued by the issuer 104-2, then the merchant's POS 110-3 needs top be modified. In this case, the POS needs to be modified to recognize a purchase card as being a cross-shopping purchase card processed at the system 100. It then must be modified to send transaction requests using such purchase cards to the system 100. As is known, this typically includes using a lookup table, pick list, or the like, having a range of account numbers or account number prefixes. When a transaction involving one of those account numbers is processed at the POS, the POS directs the associated transaction request to the switch 112-3 rather than the processing system 116.

Another possible system configuration involves switches, such as the switches 112 of FIG. 1. Switches need to be able to recognize cross-shopping transactions and direct transaction requests accordingly. In some cases, this involves identifying the issuer and recognizing that an acquiring merchant is not the merchant associated with the private label card. Hence, in some cases switches are programmed, either in hardware or software, with a range of account numbers or account number prefixes that relate to possible cross-shopping purchase cards. The switches are also programmed to identify whether a specific acquiring merchant is the issuing merchant with respect to a particular private label card.

Another possible system modification involves processing rules at the processing platform of the issuer. For example, an issuer and acquiring merchant may agree that the merchant may accept cross-shopping transactions using the issuer's card in exchange for a fee of 2.5% of the transaction amount. The processing platform needs to be able to identify such transactions and apply the fees accordingly. Hence, data storage arrangements at appropriate processing platforms are populated accordingly with rules that embody the agreement between the acquiring merchant and the issuer. Many such system modifications may be necessary according to embodiments of the invention.

At block 202, a transaction request is received at a switch. The switch may be any of the switches 112 illustrated in FIG. 1. The transaction request may include, for example, an account number, an amount, an identifier of the merchant, and the like. Then at block 204, using the account number or its prefix, the switch identifies the account as being eligible for cross-shopping transactions. The switch then uses the merchant identifier to determine whether the transaction is indeed a cross-shopping transaction. If not, the switch routes the transaction to an appropriate platform for further processing at block 206. Conversely, if the switch recognizes the transaction to be a cross-shopping transaction, then the switch routes the transaction request to a cross-shopping platform at block 208.

At the cross-shopping platform, or other appropriate platform in some embodiments, the transaction request is formatted to a standardized format at block 210. While this step is not necessary for all embodiments, its presence enables a number of different types of transactions involving any of a number of processing platforms. At block 212, processing rules specific to the transaction are located. Because cross-shopping is enabled, in some embodiments, by agreements between specific issuers and specific acquiring merchants, the entities can reach their own, non-standard agreements. Such agreements may include, for example, the process by which the issuer reimburses the acquiring merchant for transactions, the credit balance of a cardholder that may be used for cross-shopping transactions, and the like. The processing rules may be stored at any appropriate location associated with the processing platform.

Using the processing rules, a decision is made at block 214 whether the transaction would place the cardholder's balance above a cross-shopping account balance threshold. This is but one exemplary decision that may be made based on the processing rules, as is apparent to those skilled in the art. In this example, the cross-shopping threshold may be based on a percentage of the total account balance, a pre-established absolute threshold, and/or the like. In some embodiments, even a transaction that exceeds the threshold may be approved, perhaps with an "over credit limit" charge. In this example, however, a transaction that would exceed the threshold is denied at block 216. Assuming the transaction is acceptable, a transaction approval is sent at block 218.

At block 220, the transaction request is sent to the processing platform of the issuer. In some embodiments, this is done as a batch transmission from the merchant on a daily basis. In other embodiments, transaction requests are processed immediately. Other embodiments are possible. At the processing platform of the issuer, the charge is posted to the cardholder's account at block 222, and a payment from the issuer to the merchant is facilitated at block 224. In this case, the payment from the issuer to the merchant is made by way of the Automated Clearing House (ACH) network. Such payments bypass, for example, interchange networks or other processing environments that may usurp a higher fee than a simple ACH transfer. Conversely, the issuer and the merchant may agree to a fee that the issuer may withhold from payments to the accepting merchant. The fee may be per-transaction and may be a fixed amount or a percentage of the transaction amount. Of course, an issuer may aggregate a number of transactions to the acquiring merchant and send the aggregated amount to the merchant in a single payment. Many such possibilities exist.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of processing a purchase card transaction, comprising:
   receiving a transaction request at a processing system from a point-of-sale device of a first merchant, wherein
   the processing system is comprised of at least one computer system, at least one storage system, and at least one switch;
   the transaction request comprises transaction details linked to a purchase from the first merchant using a private label purchase card, the private label purchase card is:
   issued by or on behalf of a second merchant and an issuer, and
   is not issued by or on behalf of the first merchant,
   wherein at the time of purchase, the first merchant does not have an agreement with the second merchant for use of the private label purchase card;
   the first merchant and the second merchant are different merchants; and
   the transaction details comprise at least an identifier relating to the first merchant, an amount, and an account identifier relating to the private label purchase card issued by the second merchant and the issuer, but not the first merchant;
   evaluating, by the processing system, at least a portion of the account identifier;
   recognizing, by the processing system, that the account identifier relates to the issuer and does not relate to the first merchant;
   routing the transaction request to a cross-shopping platform of the processing system;
   standardizing, by the processing system, a format of the transaction request;
   using, by the processing system, the transaction request to identify rules relating to the first merchant and the issuer; and
   processing, by the processing system, the transaction request according to the rules;
   routing, by the processing system, at least a portion of the transaction request to the issuer, wherein routing at least the portion of the transaction request to the issuer comprises sending the transaction request to a processing platform of the issuer, thereby avoiding an interchange network; and
   facilitating, by the processing system, a payment from the issuer to the first merchant according to terms mutually agreed upon by the issuer and first merchant.

2. The method of claim 1, wherein facilitating a payment from the issuer to the first merchant comprises facilitating an electronic payment via an electronic payment processing network.

3. The method of claim 2, wherein the electronic payment processing network comprises the Automated Clearing House Network.

4. The method of claim 1, wherein the payment is less than the amount.

5. The method of claim 1, wherein evaluating the at least a portion of the account number comprises determining whether a prefix of the account number falls within a range of cross-shopping account number prefixes.

6. The method of claim 1, wherein receiving a transaction request at the processing system comprises receiving the transaction request at a routing switch, the method further comprising:
   prior to the transaction, receiving a request from the issuer to enroll the first merchant as a cross-shopping merchant; and
   configuring the switch to recognize a transaction request involving the first merchant and the issuer as a cross-shopping transaction and to process the transaction accordingly.

7. The method of claim 6, configuring the switch to recognize a transaction request involving the first merchant and the issuer as a cross- shopping transaction and to process the transaction accordingly comprises populating a data storage arrangement with one or more account number prefixes relating to private label purchase cards issued by the issuer, which, by virtue of an agreement between the issuer and the first merchant, the first merchant can accept for transactions.

8. The method of claim 1, further comprising:
classifying the transaction request as a cross-shopping transaction;
maintaining a record of both cross-shopping transactions and non-cross-shopping transactions with respect to two different account limits, a cross-shopping account limit and a non-cross-shopping account limit; and
for a subsequent cross-shopping transaction, rejecting the transaction request as being over the cross-shopping account limit.

9. The method of claim 8, wherein the cross-shopping account limit is less than the non-cross-shopping account limit.

10. A processing system for processing cross-shopping purchase card transactions, wherein a cross-shopping purchase card transaction is a transaction in which an accepting merchant accepts a private label purchase card related exclusively to other merchants, the processing system comprising:
a storage system configured to store settlement rules for processing cross-shopping transactions between specific issuers and accepting merchants, wherein an accepting merchant is a merchant who accepts a private label purchase card related exclusively to other merchants;
a cross-shopping transaction platform, programmed to process cross-shopping transactions according to the settlement rules, wherein the cross-shoppinq platform is comprised of at least one computer system;
a switch configured to direct incoming cross-shopping transactions to the cross-shopping transaction platform;
wherein the processing system is configured to:
standardize a format of a transaction request to an issuer, wherein:
the transaction request comprises transaction details relating to a purchase from the accepting merchant using a private label purchase card issued by or on behalf of other merchants and the issuer, and
the private label purchase card is not issued by or on behalf of the accepting merchant wherein at the time of purchase, the accepting merchant does not have an agreement with the other merchants for use of the private label purchase card;
route the transaction request to a cross-shopping platform of the processing system;
use the transaction request to identify settlement rules relating to the accepting merchant and the issuer;
process the transaction request according to the settlement rules;
send the transaction request to a processing platform of the issuer, thereby avoiding an interchange network; and
facilitate a payment from the issuer to an accepting merchant while bypassing an interchange network.

11. The system of claim 10, wherein facilitating a payment from an issuer to an accepting merchant while bypassing an interchange network comprises facilitating an electronic payment via the Automated Clearing House network.

12. The system of claim 10, wherein the settlement rules include rules that define a cross-shopping account limit that establishes a maximum account balance for cross-shopping transactions.

13. The system of claim 12, wherein the maximum account balance for cross-shopping transactions is less than a maximum account balance for all purchases.

14. The system of claim 10, wherein the settlement rules include rules that establish a discount for the payment from the issuer to the accepting merchant for cross-shopping transactions.

15. A computer-based cross-shopping purchase card processing platform, comprising:
means for receiving a transaction request formatted as a cross-shopping transaction in which an accepting merchant accepts a private label purchase card related exclusively to a different merchant, wherein:
the transaction request comprises transaction details relating to a purchase from the accepting merchant using a private label purchase card by or on behalf of the different merchant and an issuer,
but not by or on behalf of to the accepting merchant, and
at the time of purchase, the accepting merchant does not have an agreement with the different merchant for use of the private label purchase card;
means for embodying an agreement between the accepting merchant and the issuer of the private label card;
means for processing the transaction request according to the agreement;
means for standardizing a format of the transaction request;
means for routing the transaction request to a cross-shopping platform;
means for using the transaction request to identify rules relating to the accepting merchant and the issuer;
means for processing the transaction request according to the rules; and
means for sending the transaction request to a processing platform of the issuer, thereby avoiding an interchange network;
means for facilitating a payment from the issuer to the accepting merchant while bypassing an interchange network.

16. The cross-shopping purchase card processing platform of claim 15, wherein the means for facilitating a payment from the issuer to the accepting merchant while bypassing an interchange network comprises means for facilitating an electronic payment via the Automated Clearing House network.

17. The cross-shopping purchase card processing platform of claim 15, wherein the means for processing the transaction request according to the agreement comprises means for determining a discount for the payment from the issuer to the accepting merchant for cross-shopping transactions.

18. The cross-shopping purchase card processing platform of claim 15, wherein the means for processing the transaction request according to the agreement comprises means for rejecting transactions that place an account balance for cross-shopping transactions above a threshold account balance for cross-shopping transactions.

* * * * *